United States Patent
Lee et al.

(10) Patent No.: US 11,435,922 B2
(45) Date of Patent: Sep. 6, 2022

(54) CONTROL METHOD FOR STORAGE DEVICE OF DRIVING RECORDER AND STORAGE DEVICE CONTROL SYSTEM

(71) Applicant: Xiamen SigmaStar Technology Ltd., Fujian (CN)

(72) Inventors: Chia-Jung Lee, Zhubei (TW); Fu-Cheng Chen, Zhubei (TW); Chun-Nan Lu, Zhubei (TW)

(73) Assignee: SIGMASTAR TECHNOLOGY LTD., Fujian (CN)

( * ) Notice: Subject to any disclaimer, the term of this patent is extended or adjusted under 35 U.S.C. 154(b) by 108 days.

(21) Appl. No.: 16/985,288

(22) Filed: Aug. 5, 2020

(65) Prior Publication Data
US 2020/0363973 A1 Nov. 19, 2020

Related U.S. Application Data

(63) Continuation-in-part of application No. 15/709,813, filed on Sep. 20, 2017, now Pat. No. 10,769,109.

(30) Foreign Application Priority Data

Jun. 27, 2017 (TW) .................................. 106121373

(51) Int. Cl.
*G06F 7/00* (2006.01)
*G06F 3/06* (2006.01)

(52) U.S. Cl.
CPC .......... *G06F 3/0643* (2013.01); *G06F 3/0604* (2013.01); *G06F 3/0631* (2013.01); *G06F 3/0659* (2013.01); *G06F 3/0673* (2013.01)

(58) Field of Classification Search
CPC .... G06F 16/1727; G06F 16/13; G06F 3/0643; G06F 3/0659; G06F 3/0673; G06F 3/0604; G06F 3/0631
See application file for complete search history.

(56) References Cited

U.S. PATENT DOCUMENTS

| 5,367,671 A | 11/1994 | Feigenbaum et al. |
| 5,461,483 A | 10/1995 | Nakajima |
(Continued)

FOREIGN PATENT DOCUMENTS

TW 200839773 A 10/2008

OTHER PUBLICATIONS

"Method for providing extensible dos-fat system structures on one-time programmable media", https://scholar.google.com/scholar?hl=en&as, Apr. 30, 2020, 3 pages.
(Continued)

*Primary Examiner* — Mohammed R Uddin
(74) *Attorney, Agent, or Firm* — Edell, Shapiro & Finnan, LLC

(57) ABSTRACT

A control method for a storage device of a driving recorder includes: configuring a directory entry of a storage device according to a predetermined directory entry stored in a storage unit; configuring a file allocation table of the storage device according to a predetermined file allocation table stored in the storage unit; and controlling a controller to write data to the storage device according to the directory entry and the file allocation table. In one embodiment, entries of the predetermined file allocation table are interleaved to accommodate multiple files and still support a continuous write operation.

20 Claims, 13 Drawing Sheets

(56) References Cited

U.S. PATENT DOCUMENTS

| | | | |
|---|---|---|---|
| 5,574,907 A | 11/1996 | Jernigan et al. | |
| 5,581,311 A | 12/1996 | Kuroiwa | |
| 5,661,800 A | 8/1997 | Nakashima et al. | |
| 5,717,886 A | 2/1998 | Miyauchi | |
| 6,247,126 B1 * | 6/2001 | Beelitz | G06F 8/63 |
| | | | 713/1 |
| 6,604,170 B1 | 8/2003 | Suzuki | |
| 6,675,276 B2 | 1/2004 | Schulze et al. | |
| 7,856,452 B2 | 12/2010 | Itoh | |
| 8,468,290 B2 | 6/2013 | Abe | |
| 8,713,283 B2 | 4/2014 | Sinclair | |
| 8,768,986 B2 | 7/2014 | Kishikawa et al. | |
| 2003/0093611 A1 | 5/2003 | Schulze et al. | |
| 2005/0050108 A1 | 3/2005 | Sawant et al. | |
| 2006/0020745 A1 * | 1/2006 | Conley | G06F 3/061 |
| | | | 711/E12.008 |
| 2007/0162525 A1 | 7/2007 | Abe | |
| 2008/0080323 A1 | 4/2008 | Katsuo et al. | |
| 2008/0172426 A1 | 7/2008 | Patel et al. | |
| 2009/0322905 A1 | 12/2009 | Matsuda | |
| 2011/0055297 A1 | 3/2011 | Maeda et al. | |
| 2011/0196904 A1 | 8/2011 | Kishikawa et al. | |
| 2012/0173595 A1 * | 7/2012 | Salters | G06F 16/1865 |
| | | | 707/822 |
| 2013/0036257 A1 | 2/2013 | Suda et al. | |
| 2013/0110889 A1 | 5/2013 | Shogome | |
| 2014/0279950 A1 | 9/2014 | Shapiro et al. | |

OTHER PUBLICATIONS

InnovatonQ Plus-IP.com, https://iq.ip.com/discover, Apr. 30, 2020, 1 page.

* cited by examiner

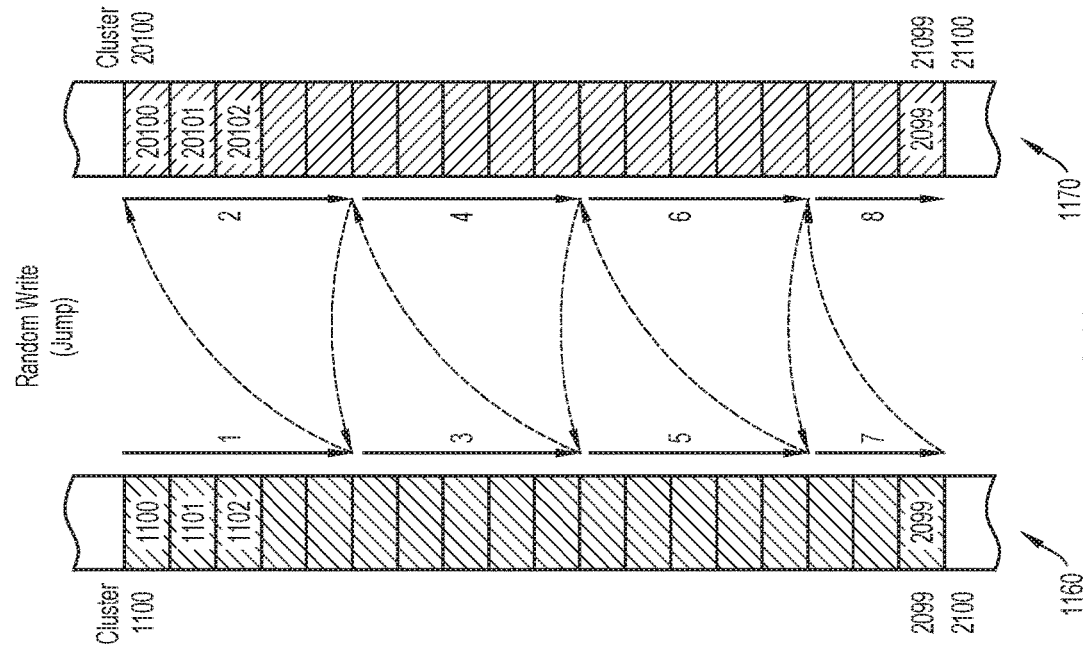
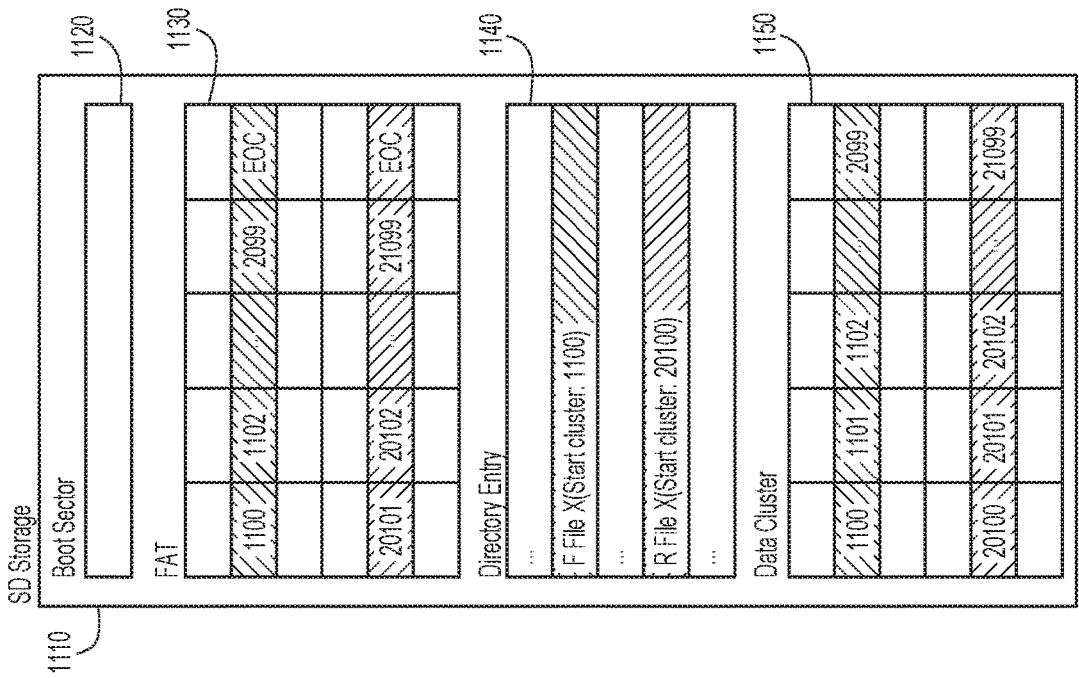
FIG. 11B
FIG. 11A

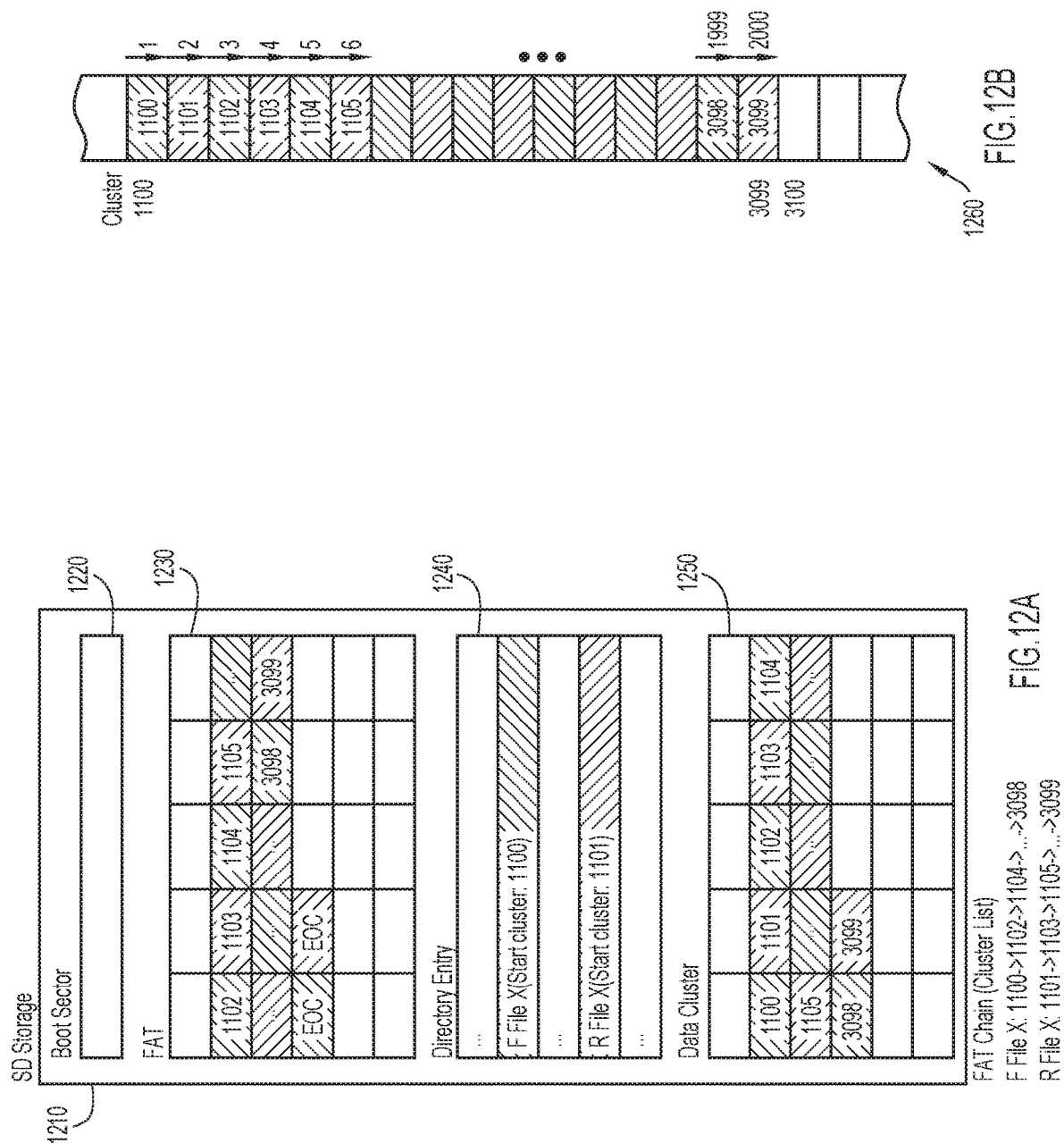

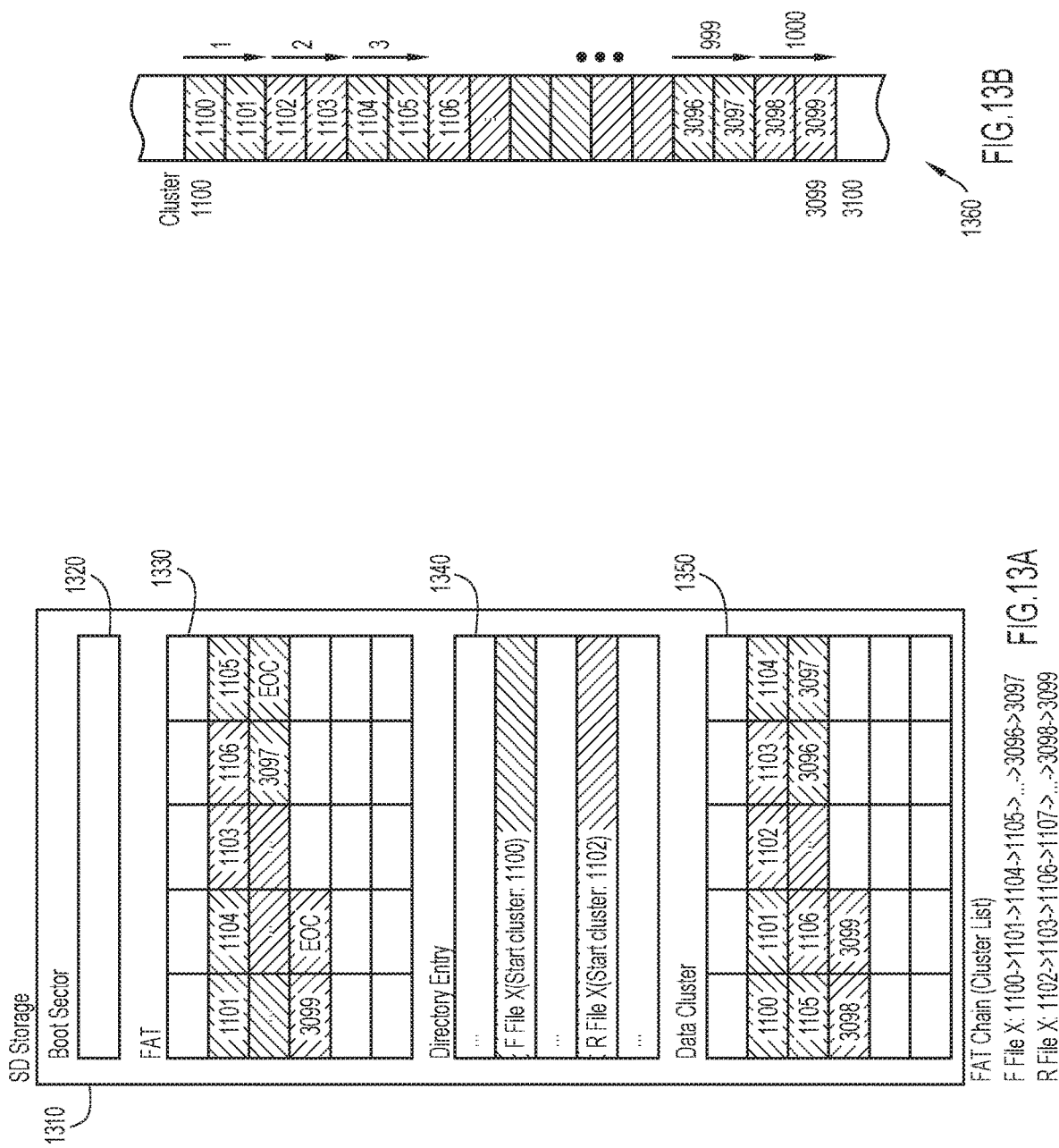

CONTROL METHOD FOR STORAGE DEVICE OF DRIVING RECORDER AND STORAGE DEVICE CONTROL SYSTEM

This application is a continuation-in-part of U.S. application Ser. No. 15/709,813, filed Sep. 20, 2017, which claims the benefit of Taiwan application Serial No. 106121373, filed Jun. 27, 2017, the subject matter of both which is incorporated herein by reference.

BACKGROUND OF THE INVENTION

Field of the Invention

The invention relates in general to a control method and a control system, and more particularly to a control method for a storage device of a driving recorder and a storage device control system.

Description of the Related Art

A file system is a system for managing files in a storage device (e.g., an SD card or a hard drive) to efficiently conduct the storage device. A file allocation table (FAT) is a common file system.

FIG. 1 shows a schematic diagram of a storage device 900 adopting a FAT file system. The storage device 900 includes a FAT 920, a directory entry 930 and a plurality of data clusters 940. Taking a driving recorder for example, after multiple operations of writing and deleting files, data of the same file may be stored in a scattered manner in non-consecutive data clusters 940. For example, as shown in FIG. 1, a file FA is stored in data clusters numbered "13", "14", "15", "19" and "20".

The directory entry 930 records a file name and a starting data cluster number in the storage device 900. The FAT 920 records a FAT chain of the data clusters. For example, the directory entry 930 indicates that a file FA is stored in the storage device 900, and the data of the file FA is stored in the data cluster 940 numbered "13". In the FAT 920, the position corresponding to the data cluster 940 numbered "13" shows "14", which indicates that subsequent data of the file FA is stored in the data cluster 940 numbered "14". In the FAT 920, the position corresponding to the data cluster 940 numbered "14" shows "15", which indicates that subsequent data of the file FA is stored in the data cluster 940 numbered "15", and so forth. In the FAT 920, the position corresponding to the data cluster 940 numbered "20" shows "EOC", which indicates that the data cluster 940 numbered "20" is end of cluster-chain (EOC) of the data cluster 940.

FIG. 2 shows a flowchart of a method for writing a file of a driving recorder. FIG. 3 is a schematic diagram of a storage device 900 operating according to FIG. 2. For example, after a recording process of the driving recorder is activated, the FAT 920 in the storage device 900 is duplicated to a dynamic random access memory (DRAM) (step S901). It is then determined whether the storage space in the storage device 900 is sufficient according to the FAT in the DRAM (step S902). If the storage device 900 has a sufficient storage space, one data cluster is selected as a starting data cluster for writing data therein (e.g., the data cluster numbered "16") (step S903), and a file name (e.g., FB) and the number of a starting data cluster (e.g., "16") are added into the FAT 930. Then, another data cluster is selected for writing data therein (e.g., the data cluster numbered "17") (step S905), the number of the data cluster (e.g., "17") is recorded in the FAT in the DRAM, at a position corresponding to the data cluster numbered "16" (step S906), and the data is written to the data cluster (step S907). The above steps are repeated until the writing process of the file is completed. Further, when the FAT in the DRAM is updated for a predetermined number of times (e.g., three times), the FAT 920 in the storage device 900 is updated according to the FAT in the DRAM until the writing process of the file ends. After the writing process of the file ends, the driving recorder again updates the FAT 920 in the storage device 900 according to the FAT in the DRAM.

However, unexpected power disconnections caused by car accidents may result in a reading failure due to an incomplete FAT chain. For example, as shown in FIG. 3, in the event of an unexpected power disconnection after the data of the file FB is written to the data cluster numbered "29", the FAT chain of the data FB is incomplete because the FAT 920 in the storage device 900 is not yet updated according to the FAT in the DRAM, in a way that the data of the file FB stored at the data clusters numbered "22" and "29" cannot be read. With respect to a driving recorder, the failure in reading data related to a car accident is an extremely severe problem.

SUMMARY OF THE INVENTION

The invention is directed to a control method for a storage device of a driving recorder and a storage device control system, which configure a storage device according to a predetermined file allocation table (FAT) and a predetermined directory entry to prevent reading failures caused by unexpected power disconnections.

According to an aspect of the present invention, a control method for a storage device of a driving recorder is provided. The control method for a storage device of a driving recorder includes steps of: configuring a directory entry of a storage device according to a predetermined directory entry stored in a storage unit; configuring a file allocation table (FAT) of the storage device according to a predetermined FAT stored in the storage unit; and controlling a controller to write data to the storage device according to the directory entry and the FAT.

According to another aspect of the present invention, a storage device control system is provided. The storage device control system includes a storage unit, a controller and a processor. The storage unit stores a predetermined directory entry and a predetermined FAT. The controller writes data to a storage device. The processor performs steps of: configuring a directory entry of the storage device according to the predetermined directory file; configuring a FAT of the storage device according to the predetermined FAT; and controlling the controller to write data to the storage device according to the directory file and the FAT.

According to another embodiment of the present invention, a control method for a storage device of a driving recorder is provided. The method includes configuring a directory entry of the storage device according to a predetermined directory entry stored in a storage unit; configuring a file allocation table (FAT) of the storage device according to a predetermined FAT stored in the storage unit; and controlling a controller to write data to the storage device according to the directory entry and the FAT, wherein entries in the FAT correspond to respective predetermined clusters in the storage device and wherein each entry in the FAT remains unchanged after new data is written to the respective predetermined clusters in the storage device.

According to one aspect of the present invention, the data comprises data from at least two files, and the FAT is configured to cause the two files to be stored in interleaved clusters.

According to another aspect of the present invention, the at least two files are video files having a same bit rate, and wherein configuring the FAT of the storage device comprises allocating a same number of the predetermined clusters to each of the at least two files.

According to still another aspect of the present invention, the at least two files are video files having bit rates different from each other, and wherein configuring the FAT of the storage device comprises allocating the predetermined clusters to each of the at least two files according to the bit rates of the at least two files.

According to another embodiment, a storage device control system is provided. The system includes a storage unit, storing a predetermined directory entry and a predetermined file allocation table (FAT); a controller, writing data to a storage device; and a processor, performing steps of: configuring a directory entry of the storage device according to the predetermined directory entry; configuring a FAT of the storage device according to the predetermined FAT; and controlling the controller to write data to the storage device according to the directory entry and the FAT, wherein entries in the FAT correspond to respective predetermined clusters in the storage device and wherein each entry in the FAT remains unchanged after new data is written to the respective predetermined clusters in the storage device.

The above and other aspects of the invention will become better understood with regard to the following detailed description of the non-limiting embodiments. The following description is made with reference to the accompanying drawings.

BRIEF DESCRIPTION OF THE DRAWINGS

FIGS. 11A and 11B are schematic diagrams illustrating a potential drawback of the file storage approach depicted in FIG. 10;

FIG. 12A is a schematic diagram of a storage device in which an interleaved FAT is configured according to an embodiment of the present invention, and FIG. 12B shows how data is stored in a plurality of clusters consistent with an interleaved approach according to an embodiment of the present invention;

FIG. 13A is a schematic diagram of a storage device in which a modified interleaved FAT is configured according to an embodiment of the present invention, and FIG. 13B shows how data is stored in a plurality of clusters consistent with the modified interleaved approach according to an embodiment of the present invention.

DETAILED DESCRIPTION OF THE INVENTION

In view of issues of a storage device of a driving recorder of the prior art, the present invention provides a control method for a storage device of a driving recorder and a storage device control system, which configure a file allocation table (FAT) and a directory entry of a storage device according to a predetermined FAT and a predetermined directory entry to prevent reading failures caused by an unexpected power disconnection.

Figure 1:
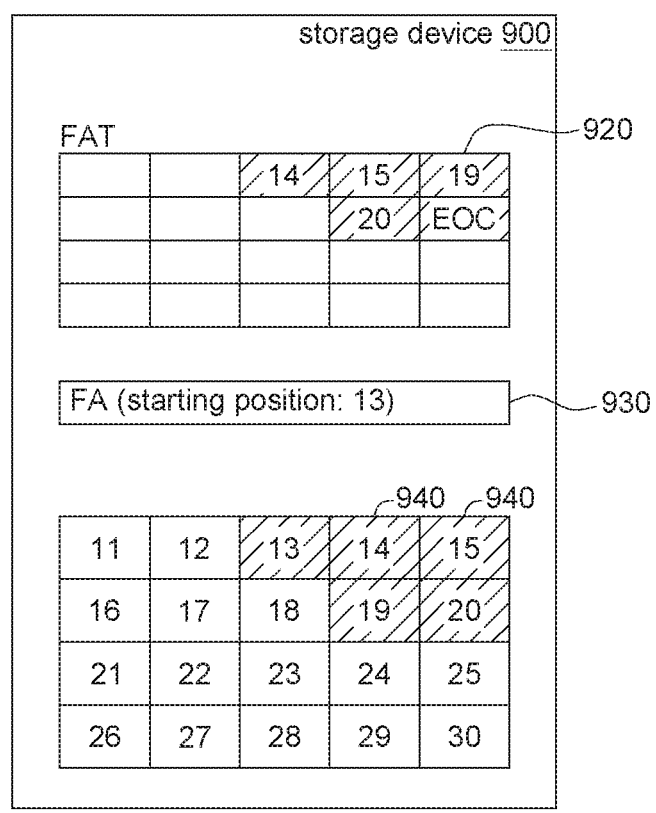
FIG. 1 (prior art) is a schematic diagram of a storage device adopting a FAT file system of the prior art.
Figure 2:
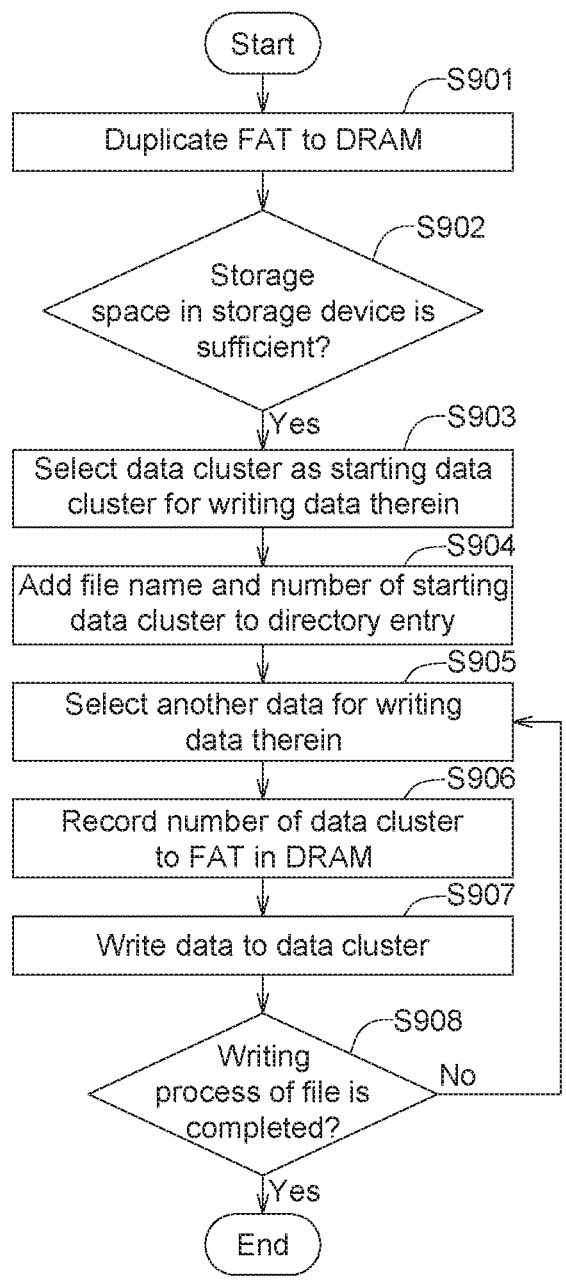
FIG. 2 (prior art) is a flowchart of a method for writing a file of a driving recorder of the prior art.
Figure 3:
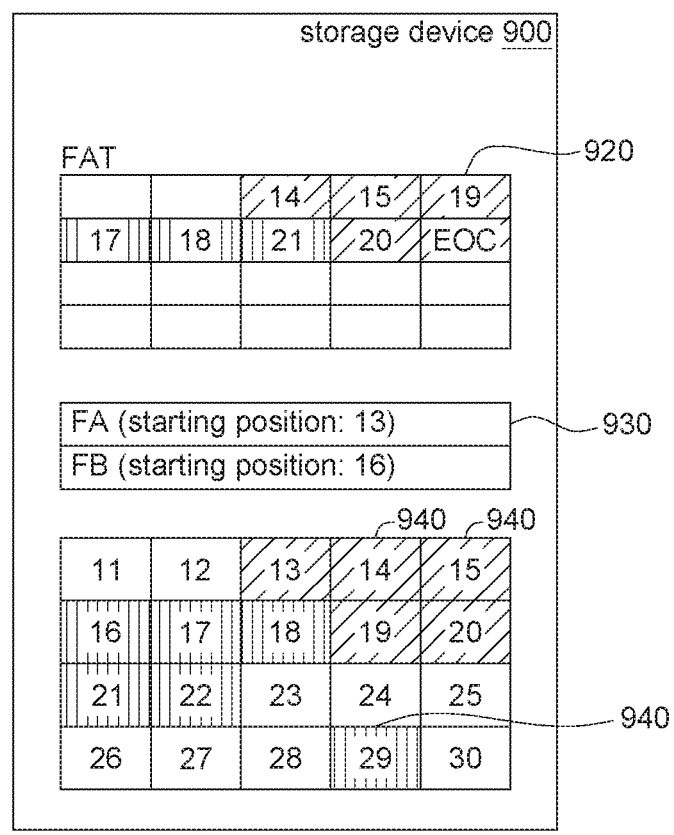
FIG. 3 (prior art) is a schematic diagram of a storage device performing the operation in FIG. 2.
Figure 4:
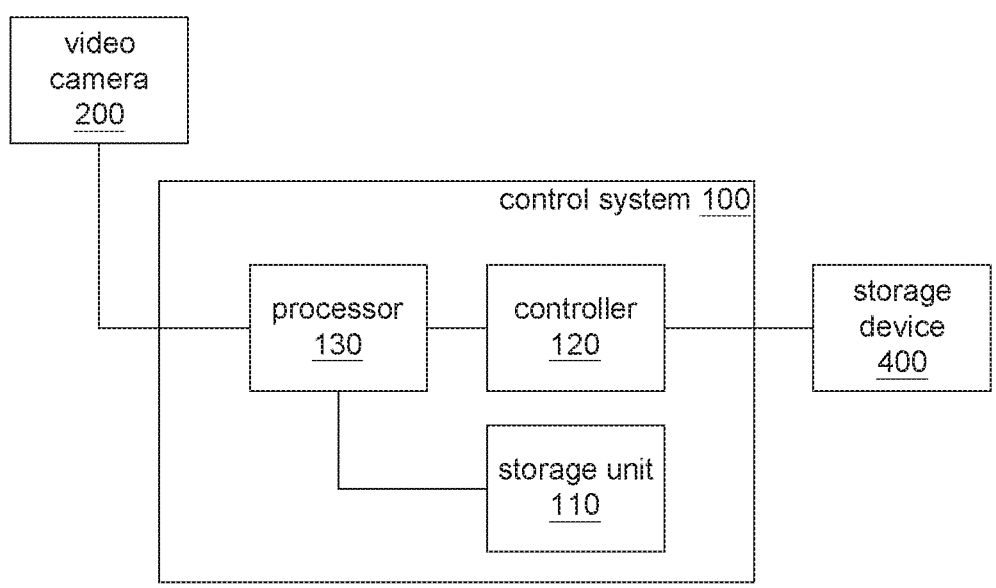
FIG. 4 is a block diagram of a control system according to an embodiment of the present invention.

FIG. 4 shows a block diagram of a control system 100 according to an embodiment of the present invention. For example, the control system 100 is a control chip. In this embodiment, the control system 100 is connected to a video camera 200 and a storage device 400. The control system 100 and the video camera 200 may be provided at a driving recorder, for example. The storage device 400 is, for example, an SD card or a hard drive, and may be built in or externally connected to the driving recorder. The control system 100 includes a storage unit 110, a controller 120 and a processor 130. The storage unit 110 stores a predetermined directory entry and a predetermined FAT. The controller 120 writes data to the storage device 400. The processor 130 configures a directory entry and a FAT of the storage device 400.

Figure 5:
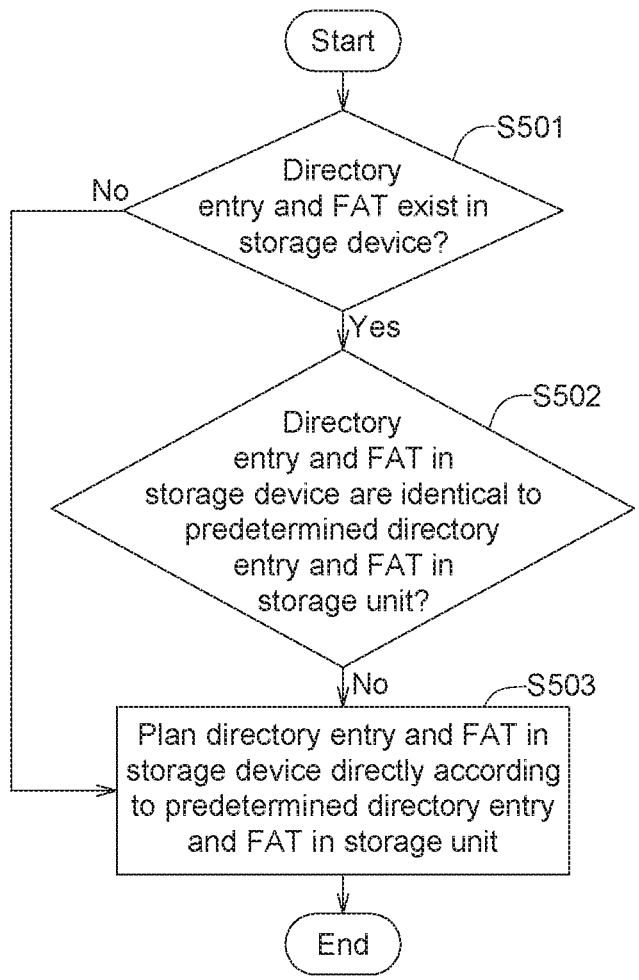
FIG. 5 is a flowchart of a control method for a storage device of a driving recorder according to an embodiment of the present invention.

FIG. 5 shows a flowchart of a control method for a storage device of a driving recorder according to an embodiment of the present invention. In this embodiment, each time the driving recorder is activated, or each time the storage device 400 is replaced, the processor 130 checks whether a directory entry or a FAT exists in the storage device 400 (step S501). If not, the processor 130 directly configures the directory entry and the FAT in the storage device 400 according to the predetermined directory entry and the predetermined FAT in the storage unit 110 (step S503); if so, the processor 130 further checks whether the directory entry and the FAT in the storage device 400 are identical to the predetermined directory entry and the predetermined FAT in the storage unit 110 (step S502). If different, the processor 130 directly configures the directory entry and the FAT in the storage device 400 according to the predetermined directory entry and the predetermined FAT in the storage unit 110 (step S503).

Figure 6:
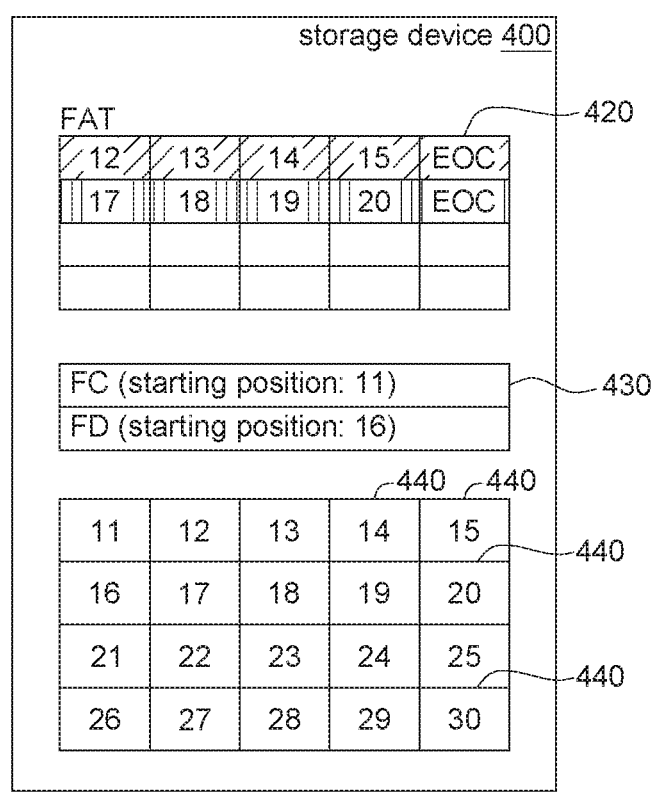
FIG. 6 is a schematic diagram of a storage device in which a directory file and a file allocation table (FAT) are configured according to an embodiment of the present invention.

FIG. 6 shows a schematic diagram of a storage device 400 in which a directory entry and a FAT are configured according to an embodiment of the present invention. The storage device 400 includes a FAT 420 configured according to a predetermined FAT, a directory entry 430 configured according to a predetermined FAT, and a plurality of data clusters 440.

As shown in FIG. 6, in the directory entry 430, the processor 130 configures a file name FC corresponding to a file and a starting data cluster corresponding to the file FC as a data cluster numbered "11"; and in the FAT 420, the processor 130 further configures the FAT chain corresponding to the file FC as the data clusters numbered "11" to "15". Similarly, in the directory entry 430, the processor 130 configures a corresponding file name FD and a starting data cluster corresponding to the file FD as a data cluster numbered "16"; and in the FAT 420, the processor 130 further configures the FAT chain corresponding to the file FD as the data clusters numbered "16" to "20".

In other words, the data of the file FC is preset to be stored in the data clusters numbered "11" to "15", and the data of the file FD is preset to be stored in the data clusters numbered "16" to "20". It should be noted that, although the directory entry 430 and the FAT 420 are already configured, in the storage device 400, the data clusters corresponding to the file FC and the file FD (i.e., the data clusters numbered "11" to "20") are not stored with the data corresponding to the file FC and the file FD, as shown in FIG. 6.

Figure 7:
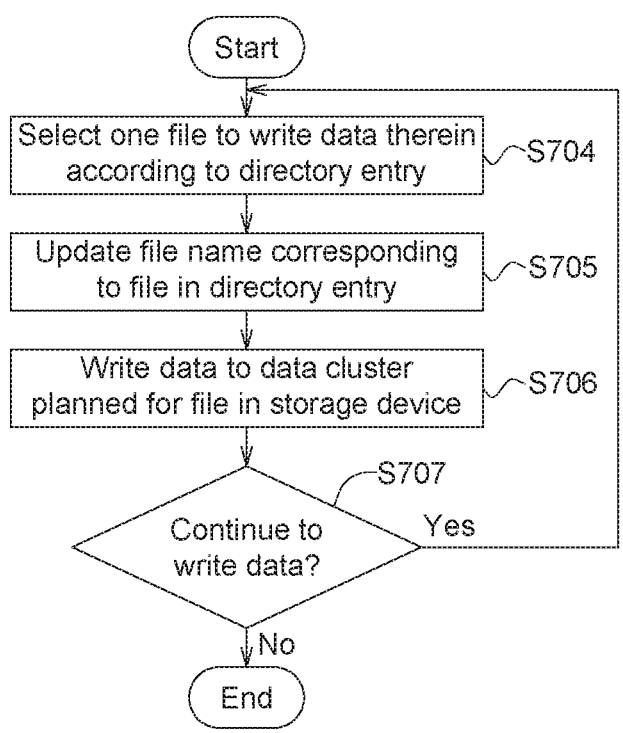
FIG. 7 is a flowchart of writing data to a storage device according to an embodiment of the present invention.

FIG. 7 shows a flowchart of writing data to the storage device 400 according to an embodiment of the present invention. In this embodiment, the processor 130 controls the controller 120 to write data to the storage device 400 according to the directory entry 430 and the FAT 420.

For example, as the driving recorder starts recording, the processor 130 selects a file for writing data therein according to the directory entry 430 (step S704). In one embodiment, the file names in the directory entry 430 carry time information, and so the processor 130 can select an oldest file for writing data therein according to the file names in the directory entry 430. Taking FIG. 6 for example, the file FC is the oldest file.

Figure 8:
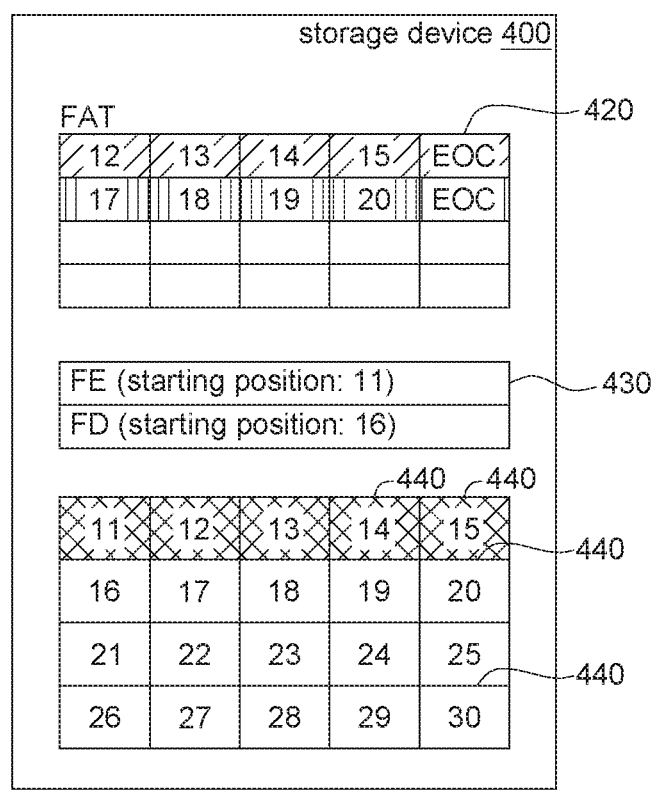
FIG. 8 is a schematic diagram of a storage device performing the operation in FIG. 7.

Next, the processor 130 changes the file name in the directory entry 430 corresponding to the file (step S705). In continuation of the above example, the processor 130 changes, in the directory entry 430, the file name of the file that the processor 130 selects for writing data therein from "FC" to "FE", as shown in FIG. 8. It should be noted that, in the directory entry 430, the starting data cluster corresponding to the file FE stays unchanged and is still the data cluster numbered "11". Further, in the FAT 420, the FAT chain corresponding to the file FE remains unchanged, and is still the data clusters numbered "11" to "15".

The processor 130 controls the controller 120 to write data to the data clusters in the storage device 400 configured for the file (step S706). In continuation of the above example, the processor 130 controls the controller 120 to write data sequentially to the data clusters numbered "11" to "15" in the storage device 400, as shown in FIG. 8.

Next, the processor 130 determines whether to continue writing data (step S707). If data is continued to be written, steps S704 to S706 are repeated; if not, the process ends.

It is known from the above that, during the process in which the processor 130 writes data to the storage device 400, the FAT 420 is not updated. Thus, even if the driving recorder encounters an unexpected power disconnection, the FAT chain corresponding to a file in the FAT is kept intact, and the data in the file in the storage device 400 can still be completely read.

Further, in the prior art, a processor needs to spend time on searching for empty data clusters for writing data therein. After multiple operations of writing and deleting a file, empty data clusters are usually in fragments, and so file writing performance is reduced. Compared to the prior art, the data clusters of files in the present invention are preconfigured and do not change, meaning that the processor need not spend time on searching for empty clusters for writing data therein, thereby enhancing the file writing performance. In one embodiment, the clusters of files may be configured as being consecutive (as shown in FIG. 6) to further enhance the file writing performance.

Further, in the prior art, a processor needs to determine whether an available space is sufficient before writing data. If the available space is insufficient, the processor needs to delete the file name and a starting data cluster corresponding to at least one file from the directory entry, and also delete the FAT chain corresponding to the least one file from the FAT, reducing the file writing performance. Compared to the prior art, the processor 130 of the present invention is not required to determine whether an available space is sufficient before writing data, nor is the processor required to delete the file name and the starting data cluster from the directory file and the FAT chain from the FAT, thereby further enhancing the file writing performance.

Figure 9:
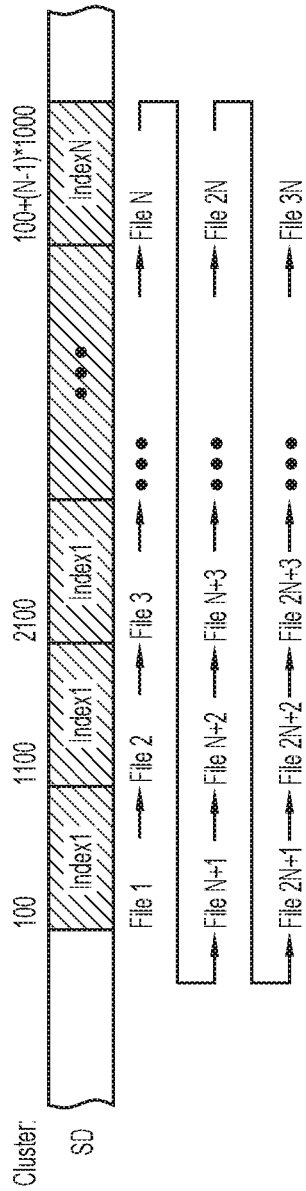
FIG. 9 shows a configuration of preconfigured continuous data clusters according to an embodiment of the present invention.

FIG. 9 shows a configuration of a preconfigured contiguous data cluster according to an embodiment of the present invention. As explained in connection with FIG. 6, when a FAT is preconfigured in the format of a contiguous data cluster, files are stored in the clusters sequentially as shown in FIG. 9. That is, in, e.g., a Secure Digital (SD) Card the memory is divided into N sections, and each section has, e.g., a continuous 1000 cluster data space. Files are written into these N sections in sequence, and a new file will overwrite a previous older file in a circular fashion. The approach illustrated by FIG. 9 functions well for simple applications of, e.g., recording only one video file at a time, but as the complexity of product applications increase, there are increasingly more applications that can record, e.g., two or more video (or other type) files at the same time.

Figure 10:
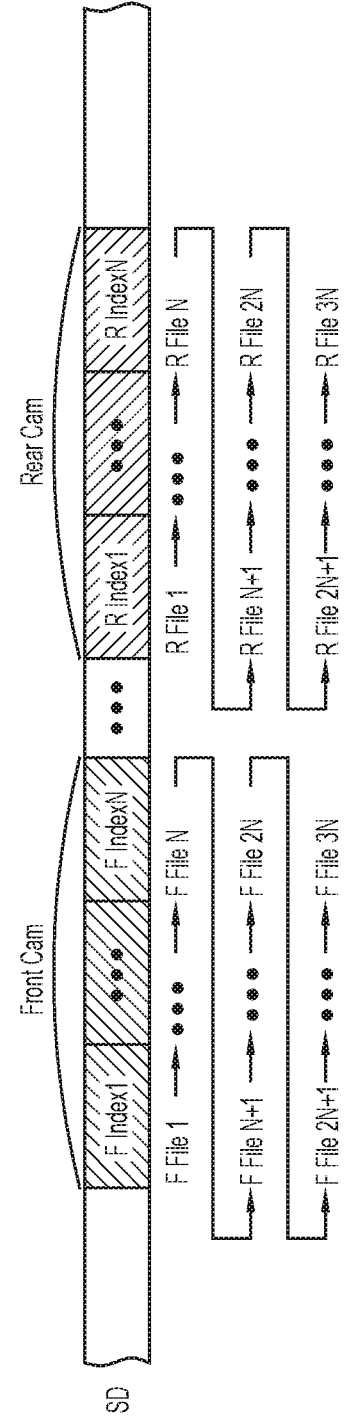
FIG. 10 shows a configuration of preconfigured continuous data clusters that support multiple files from different or the same applications according to an embodiment of the invention.

In this regard, FIG. 10 shows a configuration of a preconfigured contiguous data cluster that supports multiple files from different applications according to an embodiment of the invention. For example, two types of files in the form of large/small files corresponding, e.g., to higher resolution and lower resolution video, respectively, may be stored in memory substantially simultaneously. In another example, a multi-lens application may be implemented including, e.g., video files corresponding to a front lens and rear lens, also stored in memory substantially simultaneously. Thus, as shown in FIG. 10, and in one possible example, a front (F) camera and a rear (R) camera are assigned the same number of sections (e.g., N) to store video files. If the recording time of each video file is, e.g., one minute, then F File X and R File X should be written simultaneously over the course of one minute.

FIGS. 11A and 11B are schematic diagrams illustrating a potential drawback of the file storage approach depicted in FIG. 10. In FIG. 11A SD storage 1110 includes a boot sector 1120, a FAT 1130, a directory entry 1140 and a plurality of data clusters 1150, which are also shown logically as 1160 and 1170 in FIG. 11B. Still in the context of wanting to store two video files simultaneously, the conventional way to write, e.g., a F File X and a R File X to SD storage 1110 at the same time, relies on storage by cluster wherein F File X is stored contiguously in clusters 1100-2099 and R File X is stored contiguously in clusters 20100-21099, as shown in FIG. 11B. In this case, FAT 1130 is preconfigured to store the different files in the predetermined clusters.

However, when multiple files are written to SD storage 1110 at the same time in this fashion, an undesirable phenomenon results which reduces the efficiency of a contiguous SD write operation. More specifically, the SD write operation is based on cluster and, as such, when F File X and R File X are written to SD storage 1110 at (substantially) the same time, the actual behavior is that after F File X is written to several clusters, the system will switch to write R File X to several clusters. The system will continue to switch between the two files as indicated by numbers 1-8 in FIG. 11B. As a result, SD storage 1110 is precluded from writing continuously at a next neighboring cluster and instead, "jumps" to a far cluster to write another file. This phenomenon may be referred to as "random write" or "random jump," which causes the SD write operation efficiency to decrease.

FIG. 12A is a schematic diagram of a storage device in which an interleaved directory file and a FAT are configured according to an embodiment of the present invention, and FIG. 12B shows how data is stored in a plurality of clusters consistent with an interleaved approach according to an embodiment of the present invention. In FIG. 12A SD storage 1210 includes a boot sector 1220, a FAT 1230, a directory entry 1240, and a plurality of data clusters 1250, which are also shown logically as 1260 in FIG. 12B.

In order to address the random write issue explained with reference to FIGS. 11A and 11B, the cluster list of related video files that is stored in FAT 1230 is formatted or configured to be interleaved. Significantly, with cluster interleaving, the random write phenomenon is eliminated. This interleaved distribution approach may be based on the distribution ratio of the bit rate of each video file in the cluster.

As an example, assume that the bit rate ratio of F File X and R File X is 1:1. In such a case, FAT 1230 is formatted or configured such that each successive cluster of F File X and R File X is interleaved with one another equally, resulting in data clusters stored as shown in the plurality of data clusters 1250 and at 1260.

Of course, the bit rate ratio of F File X and R File X can also be enlarged by K times, generally represented as K:K (e.g., with K=2). In such a case, the cluster list of the two video files can be interleaved as shown in FIGS. 13A and 13B, which may be referred to as a "modified" interleaved directory file and FAT in that the interleaved cluster ratio is not limited to a single cluster to a single cluster. Thus, FIG. 13A shows SD storage 1310 including a boot sector 1320, a FAT 1330, a directory entry 1340, and a plurality of data clusters 1350, which are also shown logically as 1360 in FIG. 13B, and, as depicted, each file F File X, R File X is allotted two clusters (K=2), in an interleaved fashion. Thus, even with an increased requirement for additional clusters for each independent file, the interleaved FAT 1330 and data clusters 1350 address the random write phenomenon.

Figure 14B:
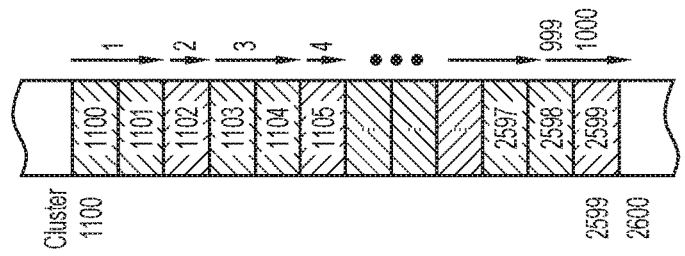
FIG. 14B shows how data is stored in a plurality of clusters consistent with the another modified interleaved approach according to an embodiment of the present invention.
Figure 14A:
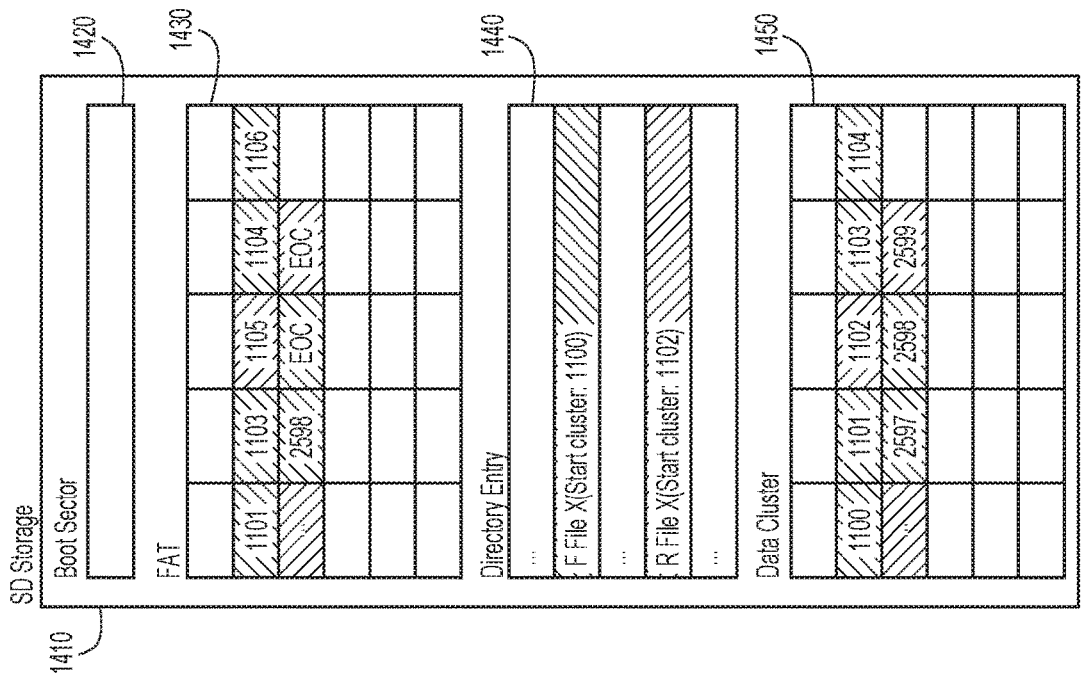
FIG. 14A is a schematic diagram of a storage device in which another modified interleaved FAT is configured according to an embodiment of the present invention.

FIG. 14A is a schematic diagram of a storage device in which another modified interleaved FAT is configured according to an embodiment of the present invention, and FIG. 14B shows how data is stored in a plurality clusters consistent with the another modified interleaved approach according to an embodiment of the present invention. FIG. 14A shows SD storage 1410 including a boot sector 1420, a FAT 1430, a directory entry 1440, and a plurality of data clusters 1450, which are also shown logically as 1460 in FIG. 14B. FIGS. 14A and 14B illustrate that a bit rate ratio of F File X and R File X need not necessarily have a 1:1 ratio, but instead might have an unequal ratio, such as 2:1. Thus, as shown in FAT 1430, two clusters are allocated to F File X for everyone one cluster allocated to R File X. The plurality of data clusters 1450 and 1460 show this same example allocation.

From the foregoing, those skilled in the art will appreciate that an undesirable random write phenomenon can occur when storing multiple files in per-file, separate, but contiguous allocated clusters. This phenomenon causes SD write performance to decline. The interleaved approach described herein addresses this defect. Further, according to the bit rate ratio between video files, the cluster list interleaving of each (video) file is configured during formatting. When the file is recorded, the system switches SD write between files according to the bit rate ratio. And, significantly, SD random write is avoided, resulting in continuous cluster write that enables SD write efficiency to be maintained.

As noted with respect to the embodiments of FIGS. 4-7, in the event of an unexpected power failure, the last written data can still be found due to the existence of a complete data link. Also, when looping recording, an old file is not deleted, only the file name is changed in the Directory Entry (430, 1140, 1240, 1340, 1440) thus improving the efficiency of shifting. Both of these advantages remain in connection with the interleaved approach described herein.

The interleaved approach may also use the bit rate ratio between (video) files to be recorded substantially at the same time to configure the allocation of each cluster. In the formatting stage, the cluster list is interleaved. When this file group (e.g., F File X and R File X) is recorded at substantially the same time, the system interlaces SD write to different files according to the ratio of the number of clusters configured. This combination can achieve continuous cluster write and maintain the efficiency of SD write.

Finally, it is noted that the described cluster list interleaved mechanism is not limited to only two video files (e.g., F File X and R File X) but can also be applied to three or more interleaved video file clusters.

While the invention has been described by way of example and in terms of the above embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A control method for a storage device of a driving recorder, comprising:
   configuring a directory entry of the storage device according to a predetermined directory entry stored in a storage unit;
   configuring a file allocation table (FAT) of the storage device according to a predetermined FAT stored in the storage unit; and
   controlling a controller to write data to the storage device according to the directory entry and the FAT,
   wherein entries in the FAT correspond to respective predetermined clusters in the storage device and wherein each entry in the FAT remains unchanged after new data is written to the respective predetermined clusters in the storage device.

2. The control method of claim 1, wherein the data comprises data from at least two files, and the FAT is configured to cause the two files to be stored in interleaved clusters.

3. The control method of claim 2, wherein the at least two files are video files having a same bit rate, and wherein configuring the FAT of the storage device comprises allocating a same number of the predetermined clusters to each of the at least two files.

4. The control method of claim 2, wherein the at least two files are video files having bit rates different from each other, and wherein configuring the FAT of the storage device comprises allocating the predetermined clusters to each of the at least two files according to the bit rates of the at least two files.

5. The control method according to claim 1, wherein the step of configuring the directory entry of the storage device comprises:
configuring in the directory entry a file name corresponding to a file.

6. The control method according to claim 5, wherein the step of configuring the directory entry of the storage device comprises:
configuring in the directory entry a starting data cluster corresponding to the file.

7. The control method according to claim 6, wherein the step of configuring the FAT of the storage device comprises:
configuring in the FAT a FAT chain corresponding to the file.

8. The control method according to claim 7, wherein the step of controlling the controller to write data to the storage device according to the directory entry and the FAT comprises:
updating in the file directory the file name corresponding to the file; and
controlling the controller to write data to the data cluster in the storage device configured for the file.

9. The control method according to claim 8, wherein in the directory entry the starting data cluster corresponding to the file stays unchanged.

10. The control method according to claim 9, wherein in the FAT the FAT chain corresponding to the file stays unchanged.

11. A storage device control system, comprising:
a storage unit, storing a predetermined directory entry and a predetermined file allocation table (FAT);
a controller, writing data to a storage device; and
a processor, performing steps of:
configuring a directory entry of the storage device according to the predetermined directory entry;
configuring a FAT of the storage device according to the predetermined FAT; and
controlling the controller to write data to the storage device according to the directory entry and the FAT,
wherein entries in the FAT correspond to respective predetermined clusters in the storage device and wherein each entry in the FAT remains unchanged after new data is written to the respective predetermined clusters in the storage device.

12. The storage device control system according to claim 11, wherein the data comprises data from at least two files, and the FAT is configured to cause the two files to be stored in interleaved clusters.

13. The storage device control system according claim 12, wherein the at least two files are video files having a same bit rate, and wherein configuring the FAT of the storage device comprises allocating a same number of the predetermined clusters to each of the at least two files.

14. The storage device control system according claim 12, wherein the at least two files are video files having bit rates different from each other, and wherein configuring the FAT of the storage device comprises allocating the predetermined clusters to each of the at least two files according to the bit rates of the at least two files.

15. The storage device control system according to claim 11, wherein the step of configuring the directory entry of the storage device comprises:
configuring in the directory entry a file name corresponding to a file.

16. The storage device control system according to claim 15, wherein the step of configuring the directory entry of the storage device comprises:
configuring in the directory entry a starting data cluster corresponding to the file.

17. The storage device control system according to claim 16, wherein the step of configuring the FAT of the storage device comprises:
configuring in the FAT a FAT chain corresponding to the file.

18. The storage device control system according to claim 17, wherein the step of controlling the controller to write data to the storage device according to the directory entry and the FAT comprises:
changing in the directory entry the file name corresponding to the file; and
controlling the controller to write data to the data cluster in the storage device configured for the file.

19. The storage device control system according to claim 18, wherein in the directory entry the starting data cluster corresponding to the file stays unchanged.

20. The storage device control system according to claim 19, wherein in the FAT the FAT chain corresponding to the file stays unchanged.

* * * * *